United States Patent [19]

Schell

[11] Patent Number: 5,077,570

[45] Date of Patent: Dec. 31, 1991

[54] PHOTO PROCESSING WORK STATION

[76] Inventor: Barry E. Schell, 13113 Tamarack Rd., Silver Spring, Md. 20904

[21] Appl. No.: 322,392

[22] Filed: Mar. 13, 1989

[51] Int. Cl.[5] ............................................ G03B 29/00

[52] U.S. Cl. ........................................ 354/354; 34/90; 34/151

[58] Field of Search ............... 354/297, 299, 307, 312, 354/317, 340, 344, 345, 354; 355/27; 34/90, 151, 155

[56] References Cited

U.S. PATENT DOCUMENTS

| | | | |
|---|---|---|---|
| 2,908,025 | 10/1959 | Ashby et al. | 354/317 X |
| 2,995,994 | 8/1961 | Jackson | 354/354 X |
| 3,151,536 | 10/1964 | Raitt | 354/354 X |
| 3,158,447 | 11/1964 | Sable | 34/151 |
| 3,508,484 | 4/1970 | Hickey | 354/345 X |
| 3,534,675 | 10/1970 | Halfen | 354/344 |
| 3,701,201 | 10/1972 | Drury | 34/60 |
| 3,836,925 | 9/1974 | Steponaitis | 354/344 |
| 3,856,555 | 12/1974 | Mandeville | 34/151 X |
| 4,132,013 | 1/1979 | Farrarell | 34/155 X |
| 4,151,657 | 5/1979 | Jensen et al. | 34/151 |

*Primary Examiner*—A. A. Mathews
*Attorney, Agent, or Firm*—Anthony T. Lane; Werten F. W. Bellamy

[57] ABSTRACT

A photo processing work station which facilitates application and drying of coatings to instant photographic prints is disclosed herein. The work station is a small, portable unit which includes a first shelf having a coating area and a utility area thereon. Attached to the first shelf is a means for covering the first shelf and a vertical backing member which includes a second shelf attached thereto. Located on the second shelf is a print dryer unit for drying the prints. The print dryer employs a high velocity fan for directing air onto a print so that it may be rapidly dried without the use of a heating element. In use, the instant photographic prints are located on the covered coating area, a chemical coating is applied and the prints are then physically moved into the print dryer unit for drying. The work station is advantageous in that it is simple, ergonomically designed and allows for rapid drying of prints without the problems associated with prior art methods.

8 Claims, 1 Drawing Sheet

PHOTO PROCESSING WORK STATION

BACKGROUND OF THE INVENTION

The present invention relates to workstations useful in coating instant photographic prints.

The existing method of coating instant photographic prints is to simply lay the print on a tabletop and coat it with a chemical applicator. To dry the coating, the print is laid face up on any available surface and allowed to dry in ambient air. This method suffers from several disadvantages. For example, coating chemicals will often spill over from the coating onto the tabletop leaving a sticky mess. In addition, prints tend to curl when drying, thereby leaving a curled print which is difficult to work with. Further, in typical applications, the instant photographic prints are produced in rapid succession and thus it is common to see prints lying all over the room in order to dry them. This makes it difficult to locate previously-taken photographs and also to keep them organized. Finally, drying in ambient air is often time consuming and may require the photographer to leave his prints overnight.

There are no other known devices presently on the market designed specifically to dry the surface coating on instant photographic prints. Equipment listed as "photographic print dryers" are designed to dry standard photo print papers after being washed in a water bath. They are large and heavy, typically 4 to 6 cubic feet and weighing 40 pounds. These devices employ heater elements in excess of 1,000 watts of power and exhaust significant quantities of heat into the surrounding area. It has never been claimed or demonstrated by the manufacturers of these devices that they could perform the drying of coatings on instant photographic prints.

Photographic equipment listed as "photo film dryers" can be divided into three categories; cabinet size, wall-mounted and desk top cabinet. The desk-top cabinet film dryer is basically a heat or hot-air dryer which is similar to a small oven and has a small low-velocity fan therein to circulate warm air within the cabinet. These dryers are generally for the purpose of drying film fresh out of the development process.

Another known device is disclosed in U.S. Pat. No. 4,132,013, issued on Jan. 2, 1979. This patent discloses an apparatus for drying individual sheets of film. The apparatus employs low heat while drying the film to prevent damage to the film. The device is small in size and mechanically simple, although it is primarily designed for use in graphic arts in which relatively large sheets of film must be processed and dried.

U.S. Pat. No. 3,856,555, issued on Dec. 24, 1974, discloses a method for drying an electrophotographic support element containing on its front surface a latent electrostatic image which has been developed in a liquid medium. This apparatus is primarily designed for drying photographic prints of unusually large size and weight, such as lithographic masters or offset printing plates. The device employs cool air for drying and includes a support element including means to circulate cool air over both the front and back surfaces of the support element which is held in an inclined position in the drying chamber.

U.S. Pat. No. 4,151,657 discloses a film dryer which is representative of typical film-drying units. The dryer includes a drying chamber wherein photographic film is dried by non-turbulent, recirculating conditioned air passing therethrough while the print film is suspended from a conveyor system. Foreign material is prevented from entering the dryer by an air curtain.

Finally, U.S. Pat. No. 3,701,201, issued on Oct. 31, 1972, discloses a microscope slide dryer which includes a substantially rectangular housing open at its front and rear wall and provided with one or more openings for the ingress of air. The front end is adapted to receive and hold the microscope slide tray. An electric fan is mounted in the rear portion of the housing and an electric lightbulb or other suitable heat source is mounted in the upper portion of the housing. A transverse heat and air baffle shield is mounted intermediate the bulb and top of the housing to improve drying.

In summary, none of the foregoing devices provides both a work area for applying a coating to instant photographic prints and a dryer unit for drying the instant photographic prints. Accordingly, there is a need in the art for a portable work station for coating and drying instant photographic prints which eliminates the messy spills and long-drying times generally associated therewith. Further, there is a need for a drying device which minimizes curling and other damage to the instant prints during drying.

SUMMARY OF THE INVENTION

The present invention relates to a portable photo-processing work station for coating and drying the surface of instant photographic prints. The work station has a first shelf including a generally horizontal coating area and a utility area. Further, the work station includes a means for providing a covering for the coating area of the first shelf attached to the utility area of the first shelf. Additionally, the work station has a substantially upright backing member attached to one end of the utility area of the first shelf and a second shelf substantially smaller than the first shelf and attached to the backing member such that the second shelf is disposed generally horizontally over at least a portion of the utility area of the first shelf. Finally, the work station includes a print dryer unit located on the upper surface of the second shelf.

Accordingly, it is the primary object of the present invention to provide a photo processing work station which is compact, portable and capable of accommodating the coating and drying of instant photographic prints.

It is a further object of the present invention to provide a photo processing work station which eliminates the chemical mess generally associated with coating and drying instant photographic prints.

It is a still further object of the present invention to provide a photo processing work station including a print dryer unit which speeds the drying time of coated instant photographic prints.

It is a still further object of the present invention to provide a print dryer unit which reduces the tendency of coated instant photographic prints to curl up during the drying process.

It is a still further object of the present invention to provide a simple, ergonomically designed work station for use in coating and drying instant photographic prints, especially those generated by scanning electron microscopes, light microscopes, oscilloscopes, medical analytical equipment and computer terminals.

These and other objects of the present invention will be apparent to one of ordinary skill in the art from the detailed description which follows.

DETAILED DESCRIPTION OF THE PREFERRED EMBODIMENTS

The present invention was specifically designed to provide a convenient and fast way to apply and dry the liquid protective coating for instant photographic prints following chemical development of the prints. The devices of the invention enable an improvement to the existing coating process. The principal components of the invention are a print dryer unit and a coordinated coater/base unit. When used together, they constitute a photo processing work station which provides a compact and efficient apparatus which can be used in an efficient method for applying and drying the liquid coating for instant photographic prints.

Figure 1:
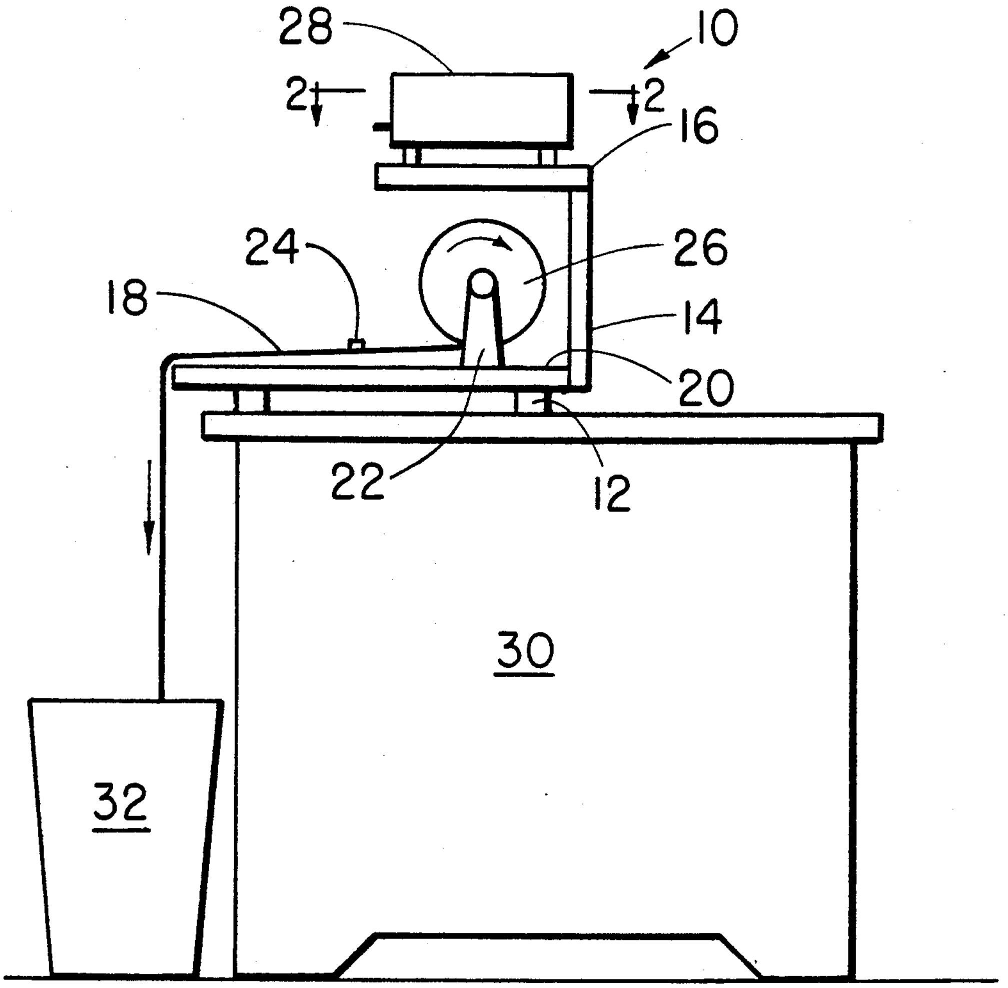
FIG. 1 is a side view of the photo processing work station in accordance with the present invention.

Referring now to FIG. 1, there is shown a photo processing work station 10 in accordance with the present invention. Work station 10 includes a first shelf 12, which is generally horizontal and having a generally vertical backing member 14 attached thereto. Attached to the top of backing member 14 is a second shelf 16 which is also generally horizontal. The first shelf 12 includes a coating area 18 and a utility area 20.

Located atop utility area 20 of the first shelf 12 is towel holder 22 which is preferably permanently affixed to utility area 20 of first shelf 12. Also shown in FIG. 1 attached to utility area 20 of first shelf 12 is towel guide 24, which also is preferably permanently affixed to first shelf 12. Towel holder 22 is designed to hold a conventional paper towel roll 26 such that towels can be dispensed along the surface of first shelf 12 under towel guide 24 to thereby cover coating area 18 as shown in the figure. Located atop second shelf 16 is print dryer 28, which is shown in greater detail in FIG. 2.

Photo processing work station 10 is most preferably located on the surface of a table 30 near one edge thereof as shown in FIG. 1. In this manner, used towels can be drawn directly from the coating area 18 off table 30 directly into a waste basket 32 as shown in the drawing to thereby avoid chemical mess in the coating process. Photo processing work station 10 is a small, ergonomically designed, portable device and may be picked up and moved to the desired location for use.

Figure 2:
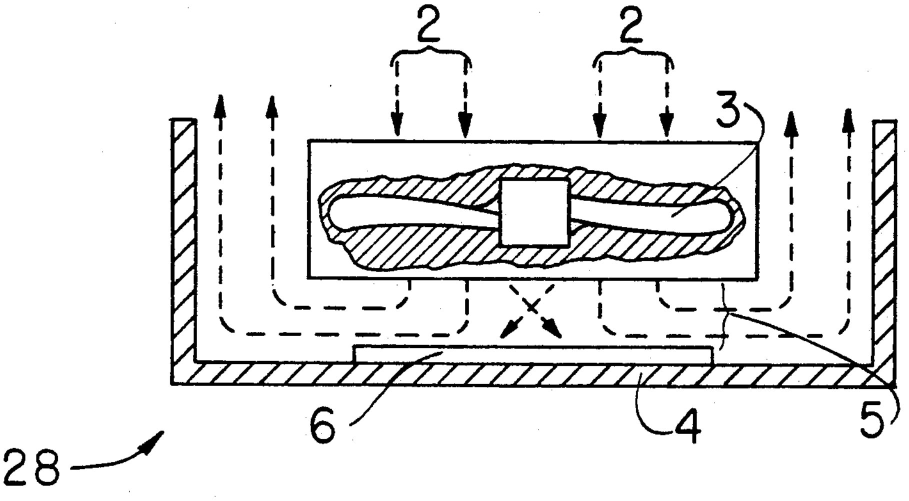
FIG. 2 is a cross-sectional view of a print dryer useful in the photo processing work station of the present invention.

Referring now to FIG. 2, there is shown print dryer 28 in cross-section. Print dryer 28 consists of a small fan 3 mechanically suspended in a metal housing 4. A slot (not shown) in housing 4 permits a print 6 to be inserted face up into print dryer 28. The bottom of housing 4 serves as the holding base for print 6 and room air is drawn into dryer 28 by fan 3 as shown by arrows 2. The room air is accelerated downward toward print 6 by fan 3 and spacing 5 between the lower-portion of fan 3 and the upper surface of print 6 provides an air cushion between fan 3 and print 6. The fan 3 is capable of providing high velocity air which is directed onto the print 6 and enables fast drying of the print without the need for heating elements. Within spacing 5 the direction of airflow coming from fan 3 is altered such that air at high velocity directly impinges on print 6 and flows uniformly from the center of print 6 outward towards the edges of print 6. The photo print 6, as well as housing 4, act as a surface air barrier in this configuration and, thus, the air pressure created in spacing 5 serves to hold print 6 securely against the bottom of housing 4 and maintain print 6 in a flat position. The high velocity air from fan 3, having passed over the surface of print 6, is then channeled by the housing upward to the top of print dryer 28 where it is exhausted into the room away from the dryer operator. The design of the exhaust air channeling is such that a minimum of air resistance is present to load or slow the operation of fan 3. In addition, the overall air channeling of the print dryer is designed such that intake and exhaust air of the unit do not disturb either the operator or the environment around the operator.

The essential physical principle of the drying operation is evaporation. During the evaporation process, liquid molecules are expelled from the surface of the coating liquid into the air adjacent the surface as vapor. This physical action continues until the air immediately above the coating liquid saturates with coating liquid molecules, at which time evaporation will cease. The rate or speed of evaporation is therefore highly dependent upon the rate of removal of the saturated air immediately above the coating liquid surface of print 6. In print dryer 28, the saturated vapor is swept away from the surface of print 6 as rapidly as it is formed thereby optimizing the evaporation process and speeding drying. Furthermore, airflow is in a radial direction starting from the center of the print and flowing outward to the edges such that no pockets or dead zones of vapor are allowed to accumulate above the surface of the print and impede the drying process in specified locations on the print surface.

The photo processing work station 10 serves four functions: a dispenser for paper towels; a work surface for applying the coating to prints; a shelf for the dryer unit and a mechanical means to integrate all functions into a compact, portable processing work station. Common kitchen towels were selected for the work station because they are almost universally available and inexpensive. Towel holder 22 is preferably a spring-loaded aluminum bar which is designed to hold each sheet of paper towel in place while the coating is applied to the instant photographic print. If the work station is positioned at the front edge of a table, used towels may be torn off or continuously rolled directly into a waste basket positioned in front of the table. This design approach virtually eliminates the sticky chemical mess left on table tops.

The shelves of the photo processing work station are preferably made from materials such as formica which are washable or other cleanable or non-rusting materials. The unit is preferably compact and light in weight, being generally 13"×16"×9" in size and less than 10 pounds in weight. It is ruggedly made with formica-bonded plywood and may be fastened together with metal brackets and stainless steel screws. Should breakage of the unit accidentally occur, individual parts may be readily replaced.

Second shelf 16 is strategically placed above towel holder 22 to hold the print dryer 28. Print dryer 28 may be rested on the shelf or may be bolted to it and it is conveniently located such that coated prints may be lifted and inserted into print dryer 28 for drying.

In general, the photo processing workstation of the present invention may be used with any office, workshop or laboratory application employing black and white instant print processing where the print type is the kind requiring application of a liquid protective coating. This type of print film is normally employed in a scientific, medical, engineering or technical environment. For example, this type of film is used in scanning electron microscopes, light microscopes, oscilloscopes, medical analytical equipment and with computer terminals. It is commonplace for scanning electron microscope users to generate many prints in a single session. Scanning electron microscope usage time is extremely expensive and typically runs at approximately $300 an hour. In addition, the usage is generally by appointment and, thus, numerous prints are made in a short time period. Accordingly, generally the prints are scattered all over the room where they collect dust and lint especially because of the sticky coating thereon. Additionally, the prints tend to curl as they dry, and if precariously positioned, the prints can fall on the floor. Further, scanning electron microscope users usually wish to refer back to previous photo prints in order to orient themselves to take future photographs. Finding previously coated prints may be a problem because the prints are usually scattered all over the room and because the scanning electron microscope is operated in semi-darkness. Finally, at the end of the session, both the investigator and the scanning electron microscope operator will desire finished, dried photo prints which can be taken from the facility immediately. With the present method of drying prints, additional time and work space is required to sort, label and store and deliver the prints at a later time and date.

The aforementioned problems are solved by the photo processing work station of the present invention which is small, compact, lightweight and portable. The unit may be located close to the scanning electron microscope operator and can be used to coat and dry photographic prints as quickly as they are produced. In addition, it provides the ability to insert and retrieve prints from the dryer unit for quick review by the investigator. Further, the device does not disturb the operator or equipment since it generates little heat, is portable and may be located anywhere desirable. Also, the invention also exhibits the features of holding the print flat while drying and requires no auxiliary heat or inlet dust filter. No other known device addresses these problems nor do they perform in the manner described herein.

Moreover, the print dryer unit used to dry the protective liquid coating dries instant photo prints four times faster than ambient air drying. Typical drying time is two minutes and the device accomplishes this without addition of heat to the drying process. Thus, the print dryer of the invention requires no heating elements, yet delivers fast drying of photographic prints. The device drying time for the prints is short enough compared to the typical picture taking and development process such that there is no backup of prints waiting to be dried. Further, no separate clips, mounts, frames or print fasteners are needed to insert the print in the dryer and hold the print in place while inside the dryer. The air pressure supplied by the dryer fan holds the print securely in place and prevents curling while drying. Finally, no air intake filters are needed. It has been demonstrated by actual use that the high velocity of the air in the drying zone above the print does not permit lint or dust to deposit on the print surface, and thus no lint or dust filters are required. The present invention thus eliminates the need to periodically clean or replace such filters.

Finally, the dryer unit is particularly useful in a scanning electron microscope laboratory since scanning electron microscopes are generally sensitive to outside mechanical and electrical disturbances. The print dryer of the present invention does not produce significant mechanical or electrical disturbances and therefore does not interfere with scanning electron microscope operation. The ability of this device to perform under these circumstances makes it extremely useful in the laboratory.

EXAMPLE 1

A print dryer unit in accordance with the present invention was fabricated and tested. The device was 8"×6"×3" and weighed two pounds and 11 ounces. The device required low power of 18 watts and generated a negligible heat output in the vicinity of the device. The sound output level of the device was 57 decibels at two feet and thus did not disturb laboratory operators. Further, the induced mechanical vibration of the device was negligible, providing only a 12 microinch displacement into a 1½" thick hardwood tabletop. Finally, the room air disturbance of the device was negligible and intake and exhaust air from the dryer are vertical, thus, air does not blow horizontally onto people or disturb papers which may be laying on the tabletop.

The foregoing description of the present invention has been presented for purposes of illustration and description only and many modifications and variations will be apparent to one of ordinary skill in the art from the above teachings. Accordingly, the scope of the invention is to be defined by the claims appended hereto.

What is claimed is:

1. A portable photo processing work station for coating and drying the surface of instant photographic prints which comprises:

a first shelf including a generally horizontal coating area and a utility area;

a means for providing a covering for said coating area of said first shelf, associated with said utility area of said first shelf;

a substantially upright backing member attached to one edge of said utility area of said first shelf;

a second shelf substantially smaller than said first shelf and attached to said backing member such that said second shelf is disposed generally horizontally over at least a portion of said utility area of said first shelf; and a print dryer located on the upper surface of said second shelf.

2. A work station as claimed in claim 1 wherein said print dryer is physically attached to said second shelf.

3. A work station as claimed in claim 1 wherein said print dryer comprises a housing having a slot therein sized to admit an instant photographic print;

a fan disposed inside said housing at the top thereof and a means for providing power to said fan.

4. A work station as claimed in claim 3 wherein said fan is capable of providing high-velocity air to dry a print.

5. A work station as claimed in claim 4 wherein said fan is located in said housing such that high velocity air blown by said fan directly impinges on a print to be dried to thereby hold the print in a substantially flat engagement with the lower surface of the slot in said housing during drying.

6. A work station as claimed in claim 1 further comprising a means for holding the covering of said coating area in position during a coating operation.

7. A work station as claimed in claim 6 wherein said covering means comprises a disposable absorbent material and said holding means comprises a bar affixed to said first shelf.

8. A work station as claimed in claim 7 wherein said covering means further comprises a mount for a roll of disposable absorbent material affixed to said utility area such that disposable absorbent material can be fed across said coating area.

* * * * *